Feb. 27, 1962

E. E. BITTMANN 3,023,402

MAGNETIC DATA STORE

Filed Jan. 28, 1959

2 Sheets-Sheet 1

INVENTOR.
ERIC E. BITTMANN

BY

Henry W. Kaufmann
AGENT

INVENTOR.
ERIC E. BITTMANN
BY
Henry W. Kaufmann
AGENT

United States Patent Office
3,023,402
Patented Feb. 27, 1962

3,023,402
MAGNETIC DATA STORE

Eric E. Bittmann, Downingtown, Pa., assignor to Burroughs Corporation, Detroit, Mich., a corporation of Michigan Filed Jan. 28, 1959, Ser. No. 789,589
4 Claims. (Cl. 340—174)

This invention relates to the digital computing and data processing arts, and more particularly to magnetic data stores useful in these and related arts.

It is known in the electrical digital computer art to store units of information having one of two possible values by the use of ferromagnetic elements capable of being magnetized stably in either one of two possible directions. In such procedure, a given unit of information is associated with a given ferromagnetic element; a first value of such a unit of information is associated with a first direction of stable magnetization of such a ferromagnetic element, and the second value of such a unit of information is associated with the second direction of stable magnetization. In the processing of numerical information, it is conventional for the two possible values of a unit of information to be "zero" and "one," and for convenience and brevity the two complementary values of a unit of information will be so denoted, although it is equally possible for them to signify "up" and "down," "yes" and "no" or any two concepts or symbols which it suits the machine designer's purpose to regard as complementary in the particular case.

The speed and flexibility of electrical circuits and devices, and the huge volume of electrical technology and specialized electrical components which are available have caused the computer and data-processing arts to employ electrical means so far as these are conveniently applicable. The use of magnetic elements for storing binary or mutually complementary elements of information lends itself very readily to use with electrical means, since fields produced by electric currents may be used to alter the magnetization of such elements and since the flux changes produced by alteration of the magnetization of such elements may readily be caused to induce voltages having characteristics indicative of the initial state from which such alteration occurs. In my copending application for United States patent Serial No. 728,212 entitled "Magnetic Data Store," filed February 14, 1958, and assigned to the same assignee as this application, I teach the use as data stores of thin films or layers of ferromagnetic alloy with suitable conductors adjacent thereto, and particular modes of operation which facilitate the use of such stores at very high speeds and great economy of equipment in the selection of the particular films or layers in which data is to be stored or from which it is to be recovered or read.

In particular, my copending application hereinabove referenced teaches the operation of magnetic data stores in which the magnetization of thin layers of ferromagnetic material is altered by rotation of the direction of magnetization of the entire layer of material, rather than by piecemeal alteration of the boundaries of magnetized domains. This mode of operation, as indicated in my prior teaching, has many advantages including speed of operation. However, it has certain characteristics which may require special design of the ancillary devices to achieve satisfactory operation. For example, the output signal produced by the data store to represent the previously recorded data will reach its maximum absolute value at a different time depending upon whether the recorded information was a "zero" or a "one"; furthermore, the output signal may be unipolar or bipolar according to the value of the information recorded. These and other characteristics of the device of my prior teaching may not, in some instances, be compatible with the simplest or most economical design of the associated equipment.

My present invention teaches the use of pairs of magnetic storage elements symmetrically connected together in such fashion that the reading or recovery of a stored "one" from the combination will produce a signal differing only in polarity, and not substantially in its variation with time, from that produced by the reading of a stored "zero." The simplicity of production of the thin films or layers which may be employed in my invention, and of the associated conductor patterns, renders it feasible and economically preferable to provide duplication of the magnetic elements themselves rather than provide relatively expensive auxiliaries to compensate for differences between the wave shape and timing of "one" and "zero" signals. Particularly because the use of my invention is well adapted to data stores operating at very high speeds, of the order of a microsecond, it is desirable that signals of either significance should become available for utilization at the earliest possible moment, since differences of as much as one tenth of a microsecond in the arrival times of output signals may increase the length of the operating cycle of the store by an appreciable percentage. Since my present invention produces output signals of well controlled wave form, or variation of amplitude with time, it is desirable to prevent, so far as feasible, the appearance in the output circuits of spurious signals which would impair the control of the wave form of such output signals; and therefore I teach novel means and method of markedly reducing or eliminating the production of such spurious signals in the practice of my present invention.

Thus one important object of my invention is to provide a magnetic data store suitable for the storage and reproduction of data at very high speeds.

A further object of my invention is to provide a magnetic data store such as to yield uniform signals, of high amplitude and fast rise time, representative of data stored in it.

Still another object of my invention is to provide a data store having the advantages mentioned in the preceding and capable of being fabricated readily, and produced economically, and in large quantities or in assemblies of large numbers of elements.

For the better understanding of my invention, I provide figures of drawing, as follows.

Figure 1:
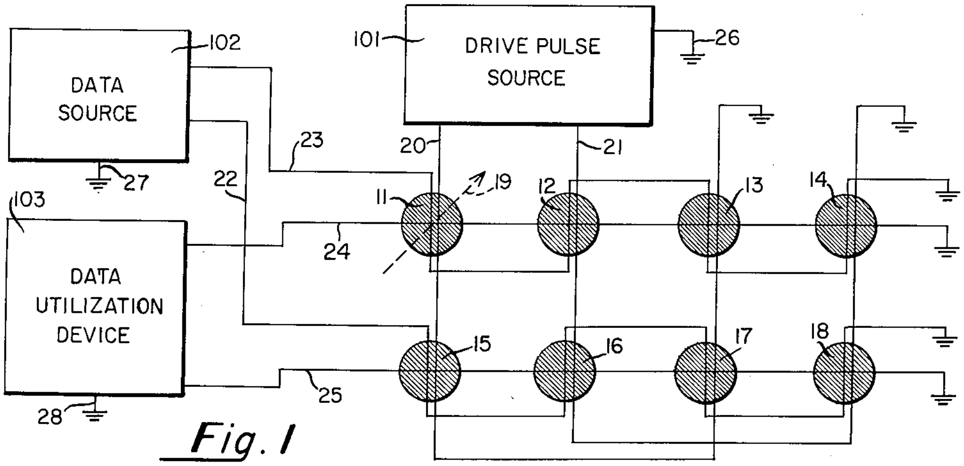
FIGURE 1 represents four pairs of elements arranged according to my invention, with symbols representative of auxiliary equipment useful in more completely teaching the practice of my invention.

In FIGURE 1 there appear eight circles, numbered 11 through 18, representing films or layers of ferromagnetic material having a preferred direction of magnetization which, for film 11 only, is represented by a dashed arrow 19. The other films 12 through 18 have similarly oriented directions of preferred magnetization, but for clarity these are not represented. From drive pulse source 101, conductor 20 is represented as passing vertically downward in the figure over films 11 and 15 and vertically upward over films 17 and 13 to ground, its circuit to drive pulse source 101 being completed through the ground conductor 26. Similarly, conductor 21 passes vertically downward in the figure over films 12 and 16 and vertically upward over films 18 and 14 to ground. It thus appears that conventional current flowing from drive pulse source 101 through drive conductor 20 to ground will produce in films 11 and 15 a magnetizing field to the right of the figure, and in films 17 and 13 a magnetizing field to the left of the figure, according to well known physical laws. Similarly, conventional current flowing from drive pulse source 101 through drive conductor 21 to ground will produce magnetizing fields to the right of the figure in films 12 and 16, and to the left of the figure in films 18 and 14. It thus appears that if films 11, 15, 17, and 13 were all initially magnetized in the direction represented by arrow 19, that is so that a north magnetic pole would exist in the upper right-hand quadrant of each of these four films, the passage through drive conductor 20 to ground of a sufficiently strong conventional current to produce at each such film a magnetizing field exceeding the coercive force of the film would cause the magnetization of films 11 and 15 to move clockwise through less than a right angle to a position horizontal in the figure, and directed to the right. Such a current would produce a magnetizing field greater than the coercive force of films 13 and 17, but directed to the left of the figure; and the direction of the magnetization of films 13 and 17 would rotate counterclockwise through more than a quadrant but less than a straight angle to a position horizontal in the figure, but directed to the left of the figure.

Sense conductor 24 passes from data utilization device 103 across films 11, 12, 13, and 14 to ground; sense conductor 25 passes from data utilization device 103 across films 15, 16, 17, and 18 to ground. Each sense conductor is substantially orthogonal to drive conductor 20 or drive conductor 21 in the vicinity of any film, and thus there is ideally no direct linkage of magnetic flux between either sense conductor and either drive conductor. However, the magnetic flux from any film links one sense conductor (and one drive conductor). The rotation of the direction of magnetization of film 11 from parallelism with arrow 19 to a horizontal rightward orientation will produce a change in flux linkage with sense conductor 24, inducing in it a voltage negative with respect to ground. The rotation of the direction of magnetization of film 13 from parallelism with arrow 19 to a horizontal leftward orientation will first produce an increased linkage with conductor, and then a decrease. This will induce in sense conductor 24 a voltage which is first positive, and then negative with respect to ground. The voltages here separately described as being induced by rotation of the directions of magnetization of films 11 and 13 will be added and their algebraic sum will appear at the end of sense conductor 24 most remote from ground.

It is clear that if films 11 and 13 had originally been magnetized in a direction antiparallel to arrow 19, i.e. parallel in direction in space but opposite in sense or sign, then application of the positive conventional current through drive conductor 20 to ground would cause the direction of magnetization of film 11 to rotate counterclockwise through somewhat more than a right angle to a horizontal position directed toward the right, and the direction of magnetization of film 13 would rotate clockwise through less than a right angle to a horizontal position directed to the left. In other words, except for a difference of one straight angle in the angles concerned, films 11 and 13 would, for an initial direction of magnetization antiparallel to arrow 19, interchange with each other the behaviour they have been described as exhibiting for initial magnetization parallel to arrow 19. Because of the difference of a straight angle (or, perhaps more simply, the reversal of directions of magnetization) existing between the two cases of different initial direction of magnetization, the voltages induced in sense conductor 24 will, while substantially symmetrical as regards variation of absolute amplitude with time, differ in sign.

Figure 2:
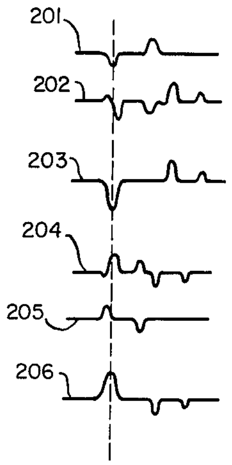
FIGURE 2 represents the variation with time of the voltages and currents associated with the writing and reading of a "zero" and of a "one" in the apparatus of FIGURE 1.

All curves in FIGURE 2 have time as the abscissa.

Referring to FIGURE 2, the first pulse in curve 201 represents the voltage induced in sense conductor 24 by the rotation of the magnetization of film 11 from the orientation parallel to arrow 19 to an orientation (in FIGURE 1) horizontal and directed to the right. The first bipolar pulse of curve 202 represents the voltage induced in sense conductor 24 by the rotation of the magnetization of film 13 from orientation parallel to arrow 19 to an orientation (in FIGURE 1) horizontal and directed to the left. Curve 203 represents the sum of the voltages represented by curves 201 and 202. The first bipolar pulse in curve 204 represents the voltage induced in the sense conductor 24 by rotation of the magnetization of film 11 from an orientation antiparallel to arrow 19 to an orientation (in FIGURE 1) horizontal and directed to the right; and the first pulse in curve 205 represents the voltage induced in sense conductor 24 by rotation of the magnetization of film 13 from an orientation antiparallel to arrow 19 to an orientation (in FIGURE 1) horizontal and directed to the left. It will be observed that curves 201 and 205, curves 202 and 204, and curves 203 and 206 (which is the sum of curves 204 and 205) are, in the pairs indicated, each symmetrical about a horizontal axis with its pair member. In other less precise but much simpler language, if both films 11 and 13 are initially oriented parallel to arrow 19 and then subjected to oppositely directed magnetizing fields from current flowing in drive conductor 20, a particular voltage wave will appear in sense conductor 24; and if films 11 and 13 are initially oriented antiparallel to arrow 19 and then subjected to the same oppositely directed magnetizing fields as in the preceding case from current flowing in drive conductor 20, there will appear in sense conductor 24 a voltage wave of the same shape (plotted against time) as in the preceding case, but opposite in polarity.

It thus appears that, if some means can be provided to place films 11 and 13 at will, both in an orientation parallel to arrow 19, or both antiparallel to arrow 19, according to the two possible values of information which are to be stored, the application of the same driving pulse of current through drive conductor 20 will produce in sense conductor 24 a voltage pulse of one polarity for an original orientation parallel to arrow 19, and a voltage pulse of the opposite polarity for an original orientation antiparallel to arrow 19; but that these two oppositely poled pulses will be symmetrical with each other along the time axis. It is a characteristic of the rotational switching procedures described that the orientation of magnetization of film 11 will, after cessation of the current in drive conductor 20, fall parallel to arrow 19; and the orientation of magnetization of film 13 at the same time will fall antiparallel to arrow 19. These opposite rest orientations of the magnetization of films 11 and 13 reflect the fact that the direction of current flow in drive conductor 20 is downward over film 11 and upward over film 13. To set the orientation of both films 11 and 13 in the same general direction, it is necessary to provide a conductor so disposed that current in it will flow in the same direction over films 11 and 13.

Inspection of FIGURE 1 reveals that information conductor 23, if it receives a conventional current from data source 102 and carries that current to ground, will cause that current to pass downward (in FIGURE 1) over film 11 and over film 13. Thus such a current will cause the magnetization of films 11 and 13 to be directed horizontally toward the right; and when the current in information conductor 23 ceases, the direction of magnetization of films 11 and 13 will come to rest substantially parallel to arrow 19. If, on the other hand, conventional current of sufficient amplitude is drawn from ground through information conductor 23 by data source 102, the magnetization of films 11 and 13 will be oriented horizontally to the left, and will fall, upon termination of the current in information conductor 23, to a position antiparallel to arrow 19. However, a current pulse in information conductor 23 sufficient alone to rotate the direction of magnetization of films 11 and 13 will also rotate the direction of magnetization of films 12 and 14; and this is not desired.

What is desired is to employ films 11 and 13 to store one binary digit or unit of information, and films 15 and 17 to store another binary digit of information, the two digits to be read out simultaneously by current in drive conductor 20, the signals representing the read values appearing on sense conductors 24 and 25, respectively. Similarly, films 12 and 14 will store one binary digit, and films 16 and 18 will store another digit, and current in drive conductor 21 will read out these two digits, which will be represented by voltages appearing on sense conductors 24 and 25, respectively. The two digits stored in films 11 and 13, and in 15 and 17 constitute what is known in computer jargon as a "word"; and the digits stored in films 12 and 14, and in 16 and 18, constitute another such word. Since only two distinct information conductors 22 and 23 are available to write in a total of four digits, it is clear that some coincident current or other selection means must be employed to permit the separate inscription of two different words into the arrangement of FIGURE 1. This may be achieved by combining the effects of current in a drive conductor (e.g. 20) with the effects of current in an information conductor (e.g. 23). It must be remembered that a read operation accomplished by passage of current through drive conductor 20 alone, in amplitude sufficient to produce magnetizing fields greater than the coercivity of each film will leave film 11 magnetized parallel to arrow 19, and film 13 magnetized antiparallel to arrow 19, regardless of the original state of magnetization of the two films. Since the storage of a digit of given value will require that both films be magnetized parallel to arrow 19, or that both be magnetized antiparallel to arrow 19, it is evident that the writing operation will be satisfactorily accomplished if the orientation of only one of films 11 and 13 is reversed, since this will automatically orient it the same as its mate. However, which of the two films 11 and 13 is to be reversed must depend upon which value of information is to be written, or recorded.

This desideratum is achieved by the following method. There is drawn from ground through drive conductor 20 by drive pulse source 101 a current of such amplitude that it produces at films 11, 15, 17, and 13 a magnetizing field equal to two-thirds of the coercive force of the film material, and oriented to the left of FIGURE 1 at films 11 and 15, and to the right of FIGURE 1 at films 13 and 17. If, now, a current of amplitude sufficient to produce at a film a magentizing field equal to one-third of the coercive force of the film material is sent from data source 102 through information conductor 23 to ground, it will subtract from the field produced at film 11 by the current in conductor 20, leaving only one-third of the coercive field directed to the left, which will produce no permanent effect. Over film 12 the current in information conductor 23 will not be able to produce a field equal to the coercive magnetizing field, so film 12 will not be permanently affected. At film 13, the magnetizing field from the current in conductor 23 will add its one-third of the coercive field to the two-thirds of the coercive field provided by the current in conductor 20, and will rotate the magnetization of film 13 toward the right of FIGURE 1, so that, when the currents in conductor 20 and conductor 23 terminate, the magnetization of film 13 will fall parallel to arrow 19, like that of film 11. If, instead of sending conventional current from itself through conductor 23 to ground, data source 102 had drawn current from ground through conductor 23, then the current in conductor 23 would have produced at film 13 a magnetizing field opposing that from the current in conductor 20, and the magnetization of film 13 would, at cessation of the two currents, have been antiparallel to arrow 19. However, at film 11 the field from the upwardly directed current in conductor 23 would have added to the field from the upwardly directed current in conductor 20, and the magnetization of film 11 would have been rotated toward the left of FIGURE 1 and, upon termination of the currents in conductor 23 and conductor 20, would have fallen antiparallel to arrow 19.

In summary, current of such magnitude as to produce two-thirds of the coercive field at any film, opposite in direction to the current employed to read out stored data, provided by drive pulse source 101 to a given drive current conductor (20 or 21 in FIGURE 1) combined with a current from data source 102 in information conductor 22 or 23 sufficient to produce a magnetizing field of one-third of the coercive field will magnetize the two films common to the drive current conductor and the information conductor in the same sense, the sense being dependent upon the polarity of the current in the information conductor. This is the writing in of information. It is evident that none of the films where there is not a simultaneous passage of currents through the drive conductor and the information conductor will be subjected, during the writing process, to a field so great as the coercive force, and therefore no such film will have its state of magnetization altered by the passage of currents aimed at writing into other films.

Figure 3:
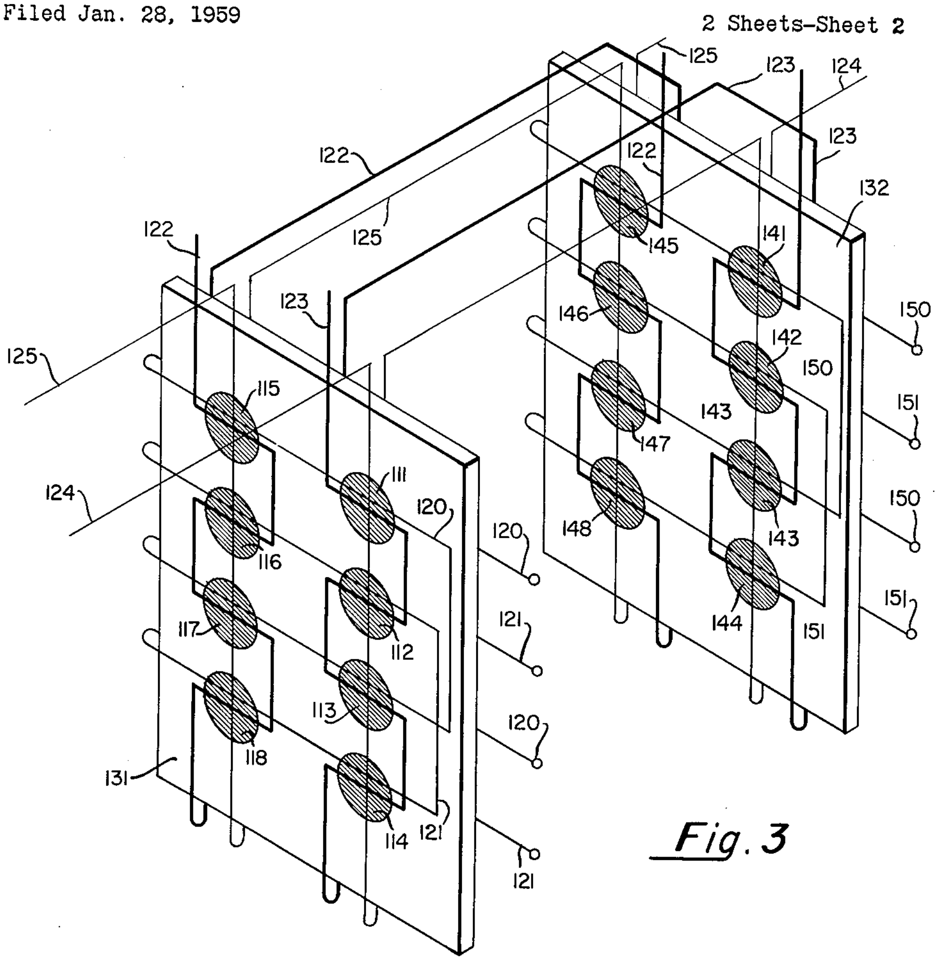
FIGURE 3 represents an assembly of two of the magnetic element and conductor assemblies represented in FIGURE 1, such that the juxtaposition of two such assemblies does not increase the stray noise in the output circuit.

It is evident, from well-known physical laws, that, while the conductors have been represented as passing on only one side of each film, it would be possible either to wind multiple-turn windings to produce at each film fields directed similarly to those produced by the single conductors represented in FIGURE 1, or it would be possible to place beneath the film array represented in FIGURE 1 a conductor pattern of exactly the same (or similar) configuration as that there represented, employing each conductor beneath the film array as a current return path for the corresponding conductor above the film array. FIGURE 3 represents such an arrangement of conductors 120 through 125 inclusive, and conductors 150 and 151. It should be understood that these conductors, as well as the conductors depicted in the other FIGURES, are electrically insulated from one another. The writing operation, since it produces changes of flux linkages with the sensing conductors, will produce voltages on the sensing conductors. Data utilization device 103 is therefore required to be insensitive to signals or voltages appearing upon sensing conductors 24 and 25 except immediately after the time when drive pulse source 101 is applying a reading current pulse to one of the drive conductors 20 or 21. This is an example of a practice so common in the computer art that it has a particular name, being known as "strobing." It will be observed that the direct inductive coupling between the sense conductors 24 and 25 and the drive conductors 20 and 21 has been made substantially zero, so that (since no voltages are deliberately applied to the information conductors 22 and 23 during the reading operation) it would appear that the only voltages induced in the sense conductors 24 and 25 during the reading operation should be the desired ones produced by rotation of magnetic flux in the films whose content is being read. Unfortunately this is not quite true; the information conductors 22 and 23 are inductively coupled both to the drive conductors 20 and 21 and to the sensing conductors 24 and 25; and the information conductors are not capable of being completely opencircuited, for even if data source 102 presents an infinite impedance to conductors 22 and 23 during the reading operation, the capacity between ground and the free end of each information conductor will render the conductor at least partly a conductive circuit. Thus the reading current pulses applied to drive conductors 20 or 21 will induce in information conductors 22 and 23 currents which will produce interfering signals in sense conductors 24 and 25. FIGURE 3 represents a feature of my invention whereby I avoid the induction of such interfering signals.

In FIGURE 3 are represented a base 131 bearing films 111 through 118, inclusive, and a base 132 bearing films 141 through 148, inclusive. Information conductor 123 is represented as passing downward in a stepwise fashion so that it passes alternately right over one film and left over the next succeeding one, finally passing beneath the lower edge of base 131 (which may be of glass-based plastic or any other convenient stable insulating material) and reascending on the other side of base 131 past the reverse side of each film in a reverse direction, so that the magnetizing effect of a current flowing in conductor 123 will be additive for its two passages on opposite sides of a given film. Conductor 123 continues across to base 132, and passes in proximity to films 141, 142, 143, and 144 in the same fashion as for the films 111 through 114 on base 131, but with this difference: the shape of the windings of conductor 123 on base 132 is symmetrical with respect to the shape of the windings of conductor 123 on base 131 about a vertical plane normal to the planes of bases 131 and 132 and passing through the centers of all the films 111 through 114. Sense conductor 124 forms a large single vertical loop around films 111 through 114, inclusive, and another single vertical loop around films 141 through 144, inclusive. The other information conductor 122 and the other sense conductor 125 are arranged in similar fashion for the remaining columns of the film areas on the bases 131 and 132 as shown in FIG. 3. It will be observed upon comparing the horizontal portions of information conductor 123 on base 131 and the horizontal portions of the same conductor on base 132 that, despite what may be called the mirror symmetry of the windings of conductor 123 on base 131 relative to those on base 132, a current of given polarity flowing in conductor 123 will produce magnetizing fields in the same orientation in films 111 and 141, in films 112 and 142, in films 113 and 143, and in films 114 and 144. In other words, the horizontal components of current flow in conductor 123 are homologous on bases 131 and 132. However, it will be found that the vertical components of current flow in conductor 123 on base 131 are opposite to the vertical components of current flow in conductor 123 on base 132. Thus the voltage induced by current changes in conductor 123 in the loop of conductor 124 passing around base 131 will be cancelled out by an equal but opposite voltage induced in the loop of conductor 124 passing around base 132. Thus, although currents flowing in drive conductors such as 120 can readily induce currents in information conductor 123, currents flowing in information conductor 123 can induce only very small voltages in sense conductor 124. Cancellation of induced voltages by opposing or bucking out a given voltage with an equal but opposite one is common in the art; but such procedure ordinarily causes a reversal of all voltages and other effects in the part of the circuit which is reversed for such opposition or bucking. In the present instance, it is the vertical segments of the conductor 123 which are relatively reversed between bases 131 and 132, since they are the portions of conductor 123 which provide undesired coupling with conductor 124; but the horizontal segments of conductor 123 are not reversed in sense as between bases 131 and 132, since it is the horizontal segments of conductor 123 which produce the desired magnetizing effects; therefore the undesired noise voltages coupled to (vertical) conductor 124 are cancelled out, but there is no cancellation or reversal of sign of the useful effect of conductor 123 in writing data into the films by magnetizing them. It is of course apparent that the cores 111 through 118 on base 131 are completely analogous with cores 11 through 18 of FIGURE 1, and that cores 141 through 148 on base 132 are similarly analogous. Drive conductors 120 and 121 on base 131, and drive conductors 150 and 151 on base 132 are respectively analogous to drive conductors 20 and 21 of FIGURE 1.

Figure 4:
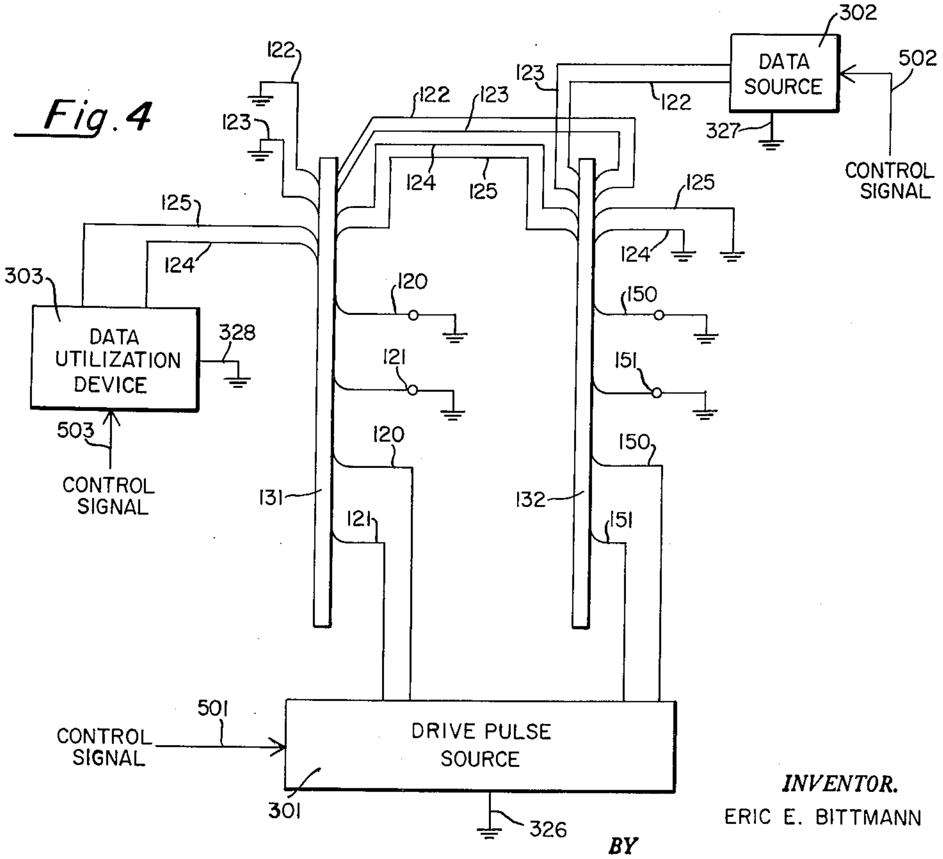
FIGURE 4 represents the assembly of FIGURE 3 with auxiliary equipment for its actual use.

By way of recapitulation and formal teaching of the use of my invention, I refer to FIGURE 4. FIGURE 4 represents schematically the two assemblies of magnetic elements and conductors represented in pictorial projection in FIGURE 3. Data source 302 is represented as connected to information conductors 122 and 123, whose remote ends are grounded, furnishing a complete circuit back to data source 302 via ground conductor 327. Data utilization device 303 is represented as connected to sensing conductors 124 and 125, whose remote ends are grounded, the circuit to data utilization device 303 being completed via ground conductor 328. Drive pulse source 301 is represented as grounded by ground conductor 326, and as connected independently to drive conductors 120, 121, 150, and 151, the remote ends of all these drive conductors being grounded, completing the circuit back to drive pulse source 301. It may be established by reference to FIGURE 3, and to the arrangement of conductors and magnetic elements represented in FIGURE 1 that the polarity of conductors 124 and 125 with respect to data utilization device 303 is the same as that of conductors 24 and 25 with respect to data utilization device 103; and that the polarization of conductors 122 and 123 with respect to data source 302 is the same as that of conductors 22 and 23 with respect to data source 102. Furthermore, drive conductors 120 and 121, and drive conductors 150 and 151, are poled the same with respect to drive pulse source 301 as are drive conductors 20 and 21 with respect to drive pulse source 101. Sameness of polarity is here used to indicate that similarly poled currents in the arrangements of FIGURE 4 will produce similar magnetizations and similar induced voltages, as in the arrangement of FIGURE 1. FIGURE 1 represents the equivalent of either the assembly on base 131 or the assembly on base 132, together with the auxiliary equipment. Drive pulse source 301 differs from drive pulse source 101 primarily in having capacity to drive selectively one of four drive conductors, rather than one of two. Data source 302 and data source 102, and data utilization device 303 and data utilization device 103 are not fundamentally different from their homologues. It is well known in the electronic art to provide devices to perform the functions to be specified for the data pulse source, the data source, and the data utilization device. It is equally well known, in the construction of an actual operating computing or data processing device, to employ various elements of a larger assembly to perform, at the appropriate time, the functions to be described here as the functions of individual devices. Similarly, the time of causing the various devices to perform their specified functions will necessarily vary according to the logical exigencies of the system and of the task being performed. Therefore each of the rectangles representative of the auxiliary equipment (301, 302, 303) is provided with a symbolic arrow to represent a control signal whose source will, in the actual practice of the invention, depend upon the logical arrangement of the computing or data processing or other device in which the data store is incorporated, or to which it is connected. Thus, the mode of operation of the data store represented in FIGURE 4 is as follows.

At a time appropriate to the logical requirements of the system employing the store, a control signal represented by arrow 501 causes drive pulse source 301 to draw from ground through a selected drive conductor (e.g. 120) a current of such amplitude that it will produce at the films traversed by the drive conductor a magnetizing field of two-thirds the magnitude of the coercive field of the films. At the same time, a control signal represented by arrow 502 causes data source 302 to apply to information conductors 122 and 123 currents sufficient to produce at the magnetic films traversed by the information magnetizing fields of one-third the magnitude of the coercive field of the films. The sign of the current will depend upon the value of the binary information to be recorded, as explained in the detailed explanation of the functioning of the apparatus of FIGURE 1. In the arrangement of FIGURE 4, there is capacity to store four two-bit words; the selection of a given one of the four words is achieved by selection of a given one of the four drive conductors 120, 121, 150, or 151 as the recipient via drive pulse source 301 of a pulse of current from ground of such amplitude as to produce at the films traversed by the selected drive conductor a magnetizing field of two-thirds the magnitude of the coercive field of the films, as described supra. Thus information consisting of two binary digits or bits may be stored in one of the four "words" of the arrangement of FIGURE 4, according to the drive conductor selected. When logically it is required that the data stored in a given word be made available to data utilization device 303, a control signal represented by arrow 501 causes drive pulse source 301 to apply to the appropriate one of the four control conductors a pulse of conventional current to ground, and of amplitude sufficient to produce at each film traversed by the selected drive conductor a magnetizing field greater than the coercive field of the film. Then, as described in more detail in connection with the functioning of the apparatus and arrangement of FIGURE 1, there will be produced a rotation of the direction of magnetization of the films traversed by the selected drive conductor (which are the films of the selected word) and there will be induced in sense conductors 124 and 125 voltages whose respective polarities will depend upon the sense of the information digits being read out. At some appropriate time before the induction of these voltages on conductors 124 and 125, there will be applied to data utilization device 303 a control signal represented by arrow 503 which will render data utilization device 303 sensitive to voltages induced on conductors 124 and 125, preferably for a period including the time of occurrence of the vertical dashed line traversing curves 201, 202, 203, 204, 205, and 206 and such as to include at least most of the loops of curves 203 and 206 which are traversed by that same dashed line. Thus information stored in the arrangement of FIGURE 4 may be caused to return or read out data stored in it. Since the two functions of storing or writing in and of returning or reading out are the two functions essential to the use of a data store, the use of my invention has been here taught. It is, of course, apparent that many practical applications of my invention will require the use of many more films for storage of larger numbers of bits, and that this increase in storage capacity may involve increase in the numbers of words and increase in the number of bits or binary digits stored as one word. However, the known art, plus my present disclosure, suffice for teaching those skilled in the art to execute these and many other obvious permutations and modifications of the principles here taught.

In a specific embodiment of my invention which I have tested, the magnetic elements or films are nickel-iron alloy approximately 2,000 Angstrom units thick; the direction of preferred magnetization is at an angle of approximately thirty degrees with the drive conductor. The films are 3/16 inch in diameter, and are on 1/4-inch centers along the direction of the drive conductors and on 3/8-inch centers along the direction of the sense conductors. The drive and information conductors are 1/16-inch wide, and the sense conductor is No. 36 American wire gauge. The magnetic elements are deposited on glass, and the conductors are supported by glass-based epoxy resin insulating board. The cycle time of the memory is about one microsecond, using reading drive pulses of about one ampere magnitude, information current pulses of about 0.4 ampere magnitude, with sense conductor voltages of about five millivolts being induced.

What is claimed is:

1. A data store comprising arrays of pairs of magnetic elements, each said magnetic element having a preferred direction of remanent magnetization along which it may be stably magnetized in either of two possible senses, the said preferred directions of the magnetic elements of any said pair being parallel to each other; sense conductors traversing said pairs of magnetic elements at an acute angle with each said preferred direction of magnetization, drive conductors orthogonal to said sense conductors in the vicinity of said magnetic elements, each said drive conductor traversing the magnetic elements of a given said pair in antiparallel directions; information conductors of which a given one traverses the same said magnetic elements as are traversed by a given said sense conductor, each said information conductor being composed of segments parallel to said sense conductor and segments orthogonal to said sense conductor, said orthogonal segments traversing the magnetic elements of a given said pair in parallel directions, the locations of homologous junctions of said parallel segments with said orthogonal segments being alternated in successive arrays.

2. A magnetic data store comprising pairs of first and second bistable ferromagnetic elements each element of which has a preferred direction of remanent magnetization along which it may be stably magnetized in either of two possible senses, and, for each said pair: means for rotating the magnetization of the first but not the second said element to a first sense to store a first value of information and for rotating the magnetization of the second but not the first said element of the said pair of a second sense to store a second value of information; means for rotating the magnetization of both said elements of the said pair to an angle intermediate between the said first and second senses of magnetization; means for detecting, by induction of voltages having characteristic initial polarities, the directions in which the magnetization of the said first and of the said second elements of the said pair are rotated to the said intermediate angle and for adding the said induced voltages to produce outputs whose initial polarity is representative of the value of information stored in the said pair.

3. A binary data store comprising pairs of bistable storage elements of which each said element is provided with writing means for altering the said element from a first stable state representative of a first value of stored information to a second complementary stable state representative of a second value of stored information and with reading means for driving the said element from either said stable state to an intermediate unstable state and with sensing means for producing a signal output at a first time interval after the actuation of the said reading means when the said element is driven from the said first stable state and at a second time interval after the actuation of the said reading means when the said element is driven from the said complementary stable state; series connecting means between the writing means of the two elements of each said pair of elements so poled that actuation of the said writing means will alter only one element of said pair to a said second complementary stable state; series connecting means between the reading means of the two elements of each said pair so poled that actuation of the said reading means will drive both of the elements of the said pair to the said intermediate unstable state; and series connecting means between the sensing means of the two elements of each said pair so poled that the said output signals from each element of the said pair will be in initially additive polarity.

4. A magnetic data storage device comprising arrays of first conductors, and of second conductors which have segments orthogonally disposed with respect to said first conductors in the vicinity of magnetic storage elements, the said orthogonally disposed segments of said second conductors being connected serially with each other by segments of said second conductors out of the said vicinity and lying substantially parallel to said first conductors, the homologous points for serially connecting said orthogonally disposed segments of said second conductors being alternated in successive arrays.

References Cited in the file of this patent

Pohrn and Rubens: "A Compact Coincident-Current Memory," Proceedings of the Eastern Joint Computer Conference, Dec. 10–12, 1956, pages 120–123.

"Thin Films, Memory Elements . . ." Electrical Manufacturing, vol. 61, No. 1, January 1958, pages 95–98.